United States Patent

[11] 3,627,690

[72] Inventors Joseph Casella
    Framingham;
    Samuel H. Stein, Lexington, both of Mass.
[21] Appl. No. 862,965
[22] Filed Oct. 1, 1969
[45] Patented Dec. 14, 1971
[73] Assignee Itek Corporation
    Lexington, Mass.

[54] PHOTOCHROMIC NAPHTHOPYRAN COMPOSITIONS
    15 Claims, No Drawings
[52] U.S. Cl. .................................................. 252/300,
    96/90 PC, 260/345.2
[51] Int. Cl. .................................................. G02b 5/24,
    F91v 9/00
[50] Field of Search ............................................ 252/300;
    260/345.2; 96/90 PC

[56] References Cited
    UNITED STATES PATENTS
    3,451,811  6/1969  Brynko .................. 96/1

| | | | |
|---|---|---|---|
| 3,441,411 | 4/1969 | Amidon et al. ............ | 96/90 PC |
| 3,361,706 | 1/1968 | Meriwether ................. | 96/90 PC |
| 3,341,330 | 9/1967 | Foris ............................. | 96/90 PC |
| 3,299,079 | 1/1967 | Taylor .......................... | 96/90 PC |

OTHER REFERENCES

Journal of Chemical Society (England) Cottam et al. 1964 Dec. pp. 5,228– 5231

Becker et al. Journal of Physical Chemistry, Vol. 72 (3) pages 997– 1000 (1968)

*Primary Examiner*—George F. Lesmes
*Assistant Examiner*—J. P. Brammer
*Attorneys*—Homer O. Blair, Robert L. Nathans, W. Gary Goodson and David E. Brook

ABSTRACT: Photochromic naphthopyran compositions containing minor amounts of either a base or a weak-to-moderate acid are disclosed. Addition of the acid or base increases the fading rate of the colored naphthopyran compositions making them useful in eye protection applications such as sunglasses.

PHOTOCHROMIC NAPHTHOPYRAN COMPOSITIONS

BACKGROUND OF THE INVENTION

1. Field of the Invention

This invention relates to photochromic compositions and more particularly to photochromic naphthopyran compositions and a method for increasing the rate of fading of irradiated naphthopyran species.

2. Description of the Prior Art

Photochromism is that property of a chemical system wherein it exhibits a reversible change in its visible absorption spectrum upon exposure to and removal of activating wavelengths of light. Consequently, the photochromic system will change from its original color to a second color upon irradiation with activating light. When the irradiation is removed, the system will revert to its original color. For a comprehensive discussion of photochromic systems, see the article entitled "Photochromism" by Dessauer & Paris which appears at pages 275–317 of Noyes, W. A., Hammond G. S., and Pitts, J. N., *Advances in Photochemistry*, vol. 1, (1963).

One problem with many of the existing photochromic compositions is the substantial difference between the rate at which they change from their original color to the irradiated color and the rate at which they revert to the original color when the irradiation is removed. While most photochromic compounds change to their colored species rapidly upon being irradiated, there is a great variance in the rate at which these compounds revert to their original species. Some compounds revert almost instantaneously, while others remain in the irradiated colored state for hours, days, months or even years, depending upon their molecular structure.

The desired rate for reversion depends, of course, on the ultimate use for the particular photochromic. For example, a photochromic system which reverts to the original state rapidly cannot be successfully used in data storage applications unless a method is found to slow the rate of reversion (i.e., "fix") of the photochromic composition from its irradiated state. One method for overcoming this problem with photochromic benzo-indolinospiropyrans is to subject the colored species of these photochromics to hydrohalic acid vapors (HCl, HBr, etc.) See Foris, U.S. Pat. No. 3,341,330. The effect of the hydrohalic vapors can be neutralized by subsequently contacting the treated photochromic spiropyran material with alkaline vapors.

For other applications of photochromic systems, the problem is exactly opposite to that encountered with attempts to use spiropyrans for data storage. Naphthopyrans, for example, typically have slower reversion rates which make them unsuitable for use in eye protection devices such as sunglasses wherein rapid reversion rates are required. Typical naphthopyrans have reversion rates which range from several hours to many days to reach complete reversion.

One method that has been used to increase the reversion rate of photochromic naphthopyrans is the application of heat to the irradiated species. Heating is often unsatisfactory, however, for many reasons. It is usually inconvenient to use heating each time a reversion occurs and heating normally requires special equipment which is cumbersome and adds expense to any photochromic device. Even with heating, typical naphthopyrans have reversion rates of several hours or more when heated to 50°–60° C. Additionally there is a limit on the temperature to which photochromic naphthopyrans can be heated before they begin to experience thermal degradation.

SUMMARY OF THE INVENTION

It has now been found that the fading rate of photochromic naphthopyran compositions can be surprisingly increased by adding minor amounts of either a base or a weak to moderate acid to the naphthopyran compositions. Because of the marked increase in fading rates, the naphthopyran compositions which can be obtained with this invention, can be successfully used in eye protection devices and similar applications where rapid reversion upon removal of the irradiation is desirable.

DESCRIPTION OF THE PREFERRED EMBODIMENTS

This invention is useful with naphthopyrans which exhibit photochromism. In their nonirradiated state, these naphthopyrans have the following structural formula and numbering sequence:

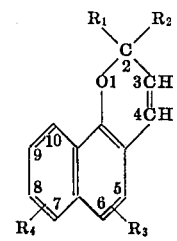

wherein:

$R_{1-2}$ are substituents individually selected from hydrogen; halide; $C_1$–$C_5$ alkyl; $C_1$–$C_2$ alkoxy; t-amine; phenyl; and substituted phenyl having up to two substituents selected from halide, $C_1$–$C_5$ alkyl, $C_1$–$C_2$ alkoxy, nitro, amide, primary (p-), secondary (s-) or tertiary (t-) amine; and, $R_{3-4}$ are substituents individually selected from $R_{1-2}$ substituents; p- or s-amine, and amide.

It is believed that these naphthopyrans exhibit photochromism when irradiated with ultraviolet light because the pyran ring structure is cleaved between the oxygen and number two carbon atom. Thus, the photochromic reaction, in terms of structural formulas, appears to be:

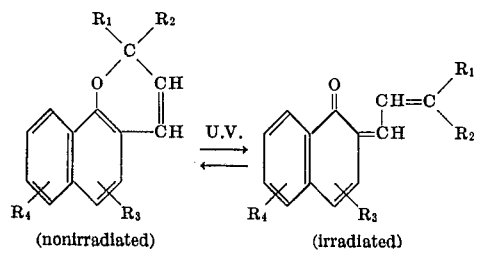

(nonirradiated)          (irradiated)

Some specific examples of photochromic naphthopyrans useful with this invention include, but are not limited to, the naphthopyrans represented by the following structural formulas in their nonirradiated state:

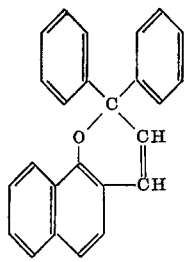

2,2-diphenyl-2H-naptho(1,2-b)pyran

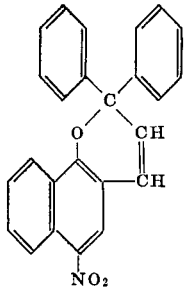

2,2-diphenyl-6-nitro-2H-naphtho(1,2-b)pyran

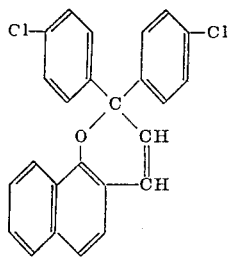

2,2-di(4-chlorophenyl)-2H-naphtho(1,2-b)pyran

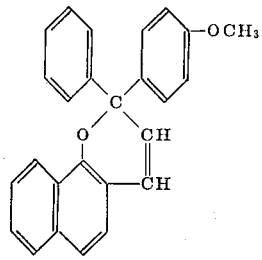

2-phenyl-2-(4-methoxyphenyl)-2H-naphtho(1,2-b)pyran

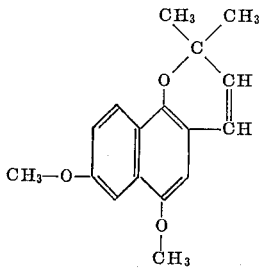

2,2-dimethyl-6,8-dimethoxy-2H-naphtho(1,2-b)pyran

Photochromic naphthopyrans can be used by forming dispersions of the naphthopyran in polymeric binders or plastisols, or by dissolving them in solvents. In general, polymers such as polymethyl methacrylate, polystyrenes, etc., are suitable as binders and organic solvents such as benzene, chloroform, methyl ethyl ketone, ethanol, etc., are suitable to dissolve the naphthopyrans. Those skilled in the art will know or easily be able to determine appropriate binders and solvents by routine experimentation.

Minor amounts of bases or weak to moderate acids are used to increase the fading rate of the above-described photochromic naphthopyrans. The exact amount of base or acid depends on such factors as the particular naphthopyran composition, the amount of photochromic material present, the particular acid or base used, the strength of the acid or base used, and the desired fading rate of the photochromic material. Using these and other factors, those skilled in the art will be able to determine the exact amount of a particular base or acid to be used with specific photochromic naphthopyran compositions. Preferably, an amount of acid or base below about 10 percent by weight based on the total photochromic composition will be used and an amount of below about 5 percent is particularly preferred. Often, amounts as low as 0.1 percent are effective.

It has been found that acids having weak to moderate strengths can be successfully used to increase the fading rate of photochromic naphthopyran compositions, but strong acids do not have this effect. A common method for expressing the relative strengths of acids is in terms of pKa values, which are equivalent to the negative logarithm of an acid's dissociation constant in water. Using the pKa values given at pages D–90–1 of the *CRC Handbook of Chemistry and Physics*, 49th Edition, 1968–1969, it has been found that acids having pKa values between about 4 and 14 can be effectively used to control the fading rate of photochromic naphthopyrans. The preferred acids are those having pKa values of from about 4.5 to about 9.

Within the aforementioned strength limitations, all types of acids can be used. Both inorganic and organic acids increase the fading rate of photochromic naphthopyrans. Additionally, organic acids can be mono- or polycarboxylic and can be saturated or unsaturated. Organic carboxylic acids are particularly advantageous for certain photochromic applications such as sunglasses because they are nonvolatile and can easily be incorporated in polymeric binders.

While only weak to moderate acids can be used, it has been found that bases will operate whether they are strong, moderate or weak in strength. Similarly to the acids, a common method of expressing the strength of bases is in terms of pKb values which are equal to the negative logarithm of a base's dissociation constant in water. The pKb values can be calculated from the pKa values given at pages D–88–9 of the *CRC Handbook of Chemistry and Physics* using the formula $pKa + pKb = 14$. Using pKb values, it has been found that bases having a pKb value of from about 2 to about 14 can be used to control the fading rate of photochromic naphthopyrans. The preferred bases have pKb values of from about 2.5 to about 9.

Within the strength limitations given, both inorganic and organic compounds which contain one or more basic functional groups can be used.

For polyfunctional acids or bases, the respective pKa and pKb values that should be within the indicated ranges are those values for the first step in the dissociation process. For example, sulfurous acid has a pKa value of about 1.81 for step 1, and therefore would not be in the operative range of pKa values from 4–14 even though its pKa value for step 2 is about 6.91.

The pKa and pKb values used in determining operative and preferred base and acid strengths should be taken at about 25° C.

The mechanism involved in controlling the fading rate with minor amounts of bases or moderate to weak acids is not thoroughly understood. It appears, however, that a different mechanism is involved for acids than is involved for bases. The following explanations are not intended to be binding, but are only offered as possible explanations of these phenomena.

With acids, a possible explanation is that the irradiated form makes catalytic use of a proton supplied by the acid in its rearrangement to the nonirradiated state. Expressed in terms of structural formulas, this would be as follows:

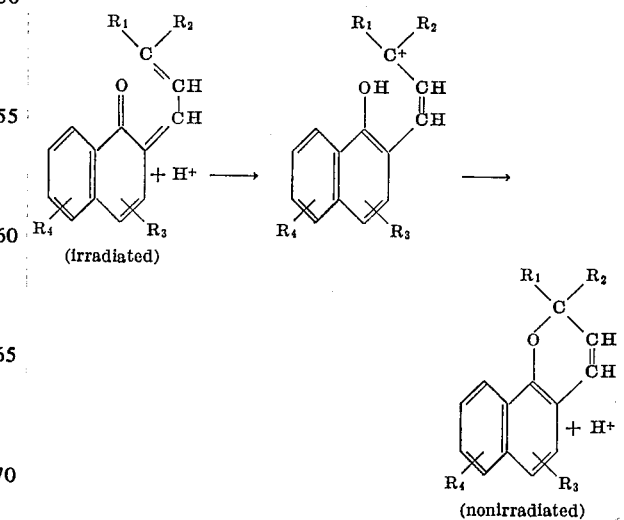

Support for this explanation is found in the fact that the solutions of photochromic naphthopyrans retain their photochromic properties even after addition of the acid which indicates that no permanent additions are made to the molecules by the acids.

With bases, the site of the reaction is more likely to be the 2H carbon atom of the pyran ring, which is electrophilic and subject to nucleophilic attack. In terms of structural formulas and using the nitrogen atom N: which could be obtained from a compound such as pyridine as the base, this would be represented as:

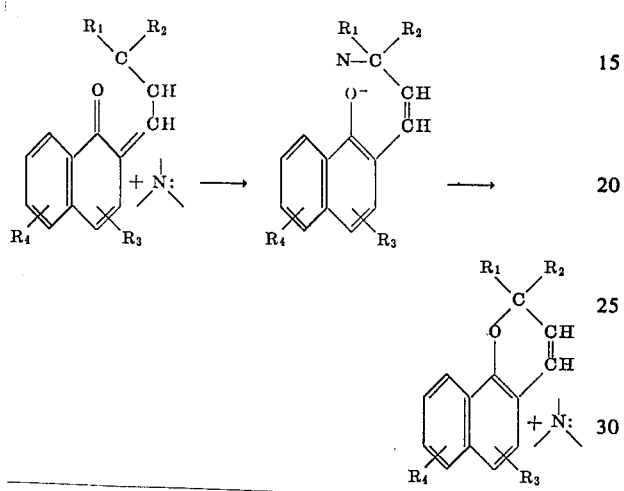

The photochromic naphthopyran compositions and the process for controlling the fading rate of such compositions are generally useful in any application wherein photochromic compounds or compositions are presently used. Some applications for such photochromics which have been described in the literature include photographic dodging, photochromic windows, photochromic nonglare mirrors and photochromic eye protection devices. The compositions and process of this invention are particularly useful in producing photochromic sunglasses which are colorless in the absence of bright sunlight and which are converted to the colored species by the ultraviolet light present in sunlight thereby reducing glare.

Usually the irradiated forms of naphthopyrans are colored and the nonirradiated forms are colorless or very pale colors. This is not always true, however. Therefore, the term "fading rate" is used to mean the rate at which a naphthopyran returns to its nonirradiated form after irradiation ceases, whether the nonirradiated form is colorless or has a more intense color than the irradiated form.

The invention is further illustrated by the following examples. All parts and percentages are by weight unless otherwise specified.

EXAMPLE I

Increased Fading Rate for 2,2-diphenyl- 2H-naphtho (1, 2-b) pyran by Adding Acids Techniques for preparing 2,22H-naphtho (1, 2-b) pyran are described by Livingstone and Cottam at *J. Chem. Soc.*, p. 5,228, 1964. This photochromic naphthopyran has a very pale yellow color (almost colorless) in its nonirradiated state which changes to orange when the compound is irradiated with ultraviolet light.

One cell of a Beckman D.U. spectrophotometer was filled with a $7.5 \times 10^{-4}$ molar solution of 2,22H-naphtho (1, 2-b) pyran in methanol. The other cell of the spectrophotometer was filled with pure methanol. Both cells were thermostated at 25° C. ± 0.1° C. The initial transmittance before irradiation was measured using light with a wavelength of 460 nanometers and found to be 69.5 percent.

Each of the solutions was removed from the spectrophotometer and illuminated with an 8 watt "Blacklite" fluorescent tube for 2.5 minutes and then placed back into their respective cells. A first reading was taken immediately of the transmittance and the time was designated as zero minutes. Periodic transmittance measurements were taken as the orange colored photochromic compound returned to its original form. This data was plotted and used as a control.

The same experiment was repeated twice, except that a small amount of acetic acid ($pKa$=4.75 at 25° C.) was added to the photochromic naphthopyran solution in the first case and a small amount of phenol ($pKa$=9.89 at 20° C.) was added in the second case. In the case of the acetic acid, approximately one drop was added per 3 mililiters of solution. In the case of the phenol, approximately one tiny granule of the solid phenol was added per 3 mililiters of solution. The data obtained was used to form a plot of the percent transmittance versus time.

Results of this experiment taken from the plot were:

% TRANSMITTANCE AT 460 NANOMETERS

| TIME (min.) | CONTROL | ACETIC ACID | PHENOL |
| --- | --- | --- | --- |
| 0 | 0 | 1 | 0.5 |
| 5 | 1.5 | 3 | 1.5 |
| 10 | 2.5 | 7 | 4.5 |
| 20 | 4.5 | 18 | 16 |
| 30 | 6 | 28 | 28 |
| 40 | 7 | 34.5 | 38 |
| 50 | 8 | 38.5 | 43 |
| 60 | 9 | 40 | 47 |
| 70 | 9.5 | 41.5 | 49.5 |
| 80 | 10.5 | 42 | 50 |

As can be seen, the addition of minor amounts of weak to moderate acids greatly increased the fading rate of 2,2-diphenyl-2H-naphtho (1, 2-b) pyran.

EXAMPLE II

Increased Fading Rate for 2,2-diphenyl-6-nitro-2H-naphtho (1, 2-b) pyran by Adding Acids or Bases 2,2-diphenyl-6-nitro-2H-naphtho (1, 2-b) pyran can be prepared by nitrating the six carbon atom of the naphthalene ring of the compound of example I using glacial acetic acid and fuming nitric acid at room temperature. This is a standard nitration method well known to those skilled in the art. In the nonirradiated condition, this photochromic naphthopyran has a pale yellow color (almost colorless) which changes to a reddish orange color upon illumination with ultraviolet light.

The procedure of example I was repeated except that a $3.7 \times 10^{-4}$ molar solution of 2,2-diphenyl-6-nitro-2H-naphtho-(1, 2-b) pyran in benzene was used. Additionally, the base pyridine ($pKa$=8.75 at 25° C.) was used in place of the acid phenol to increase fading rate. Initially, the transmittance of the photochromic solution was 96 percent measured with light having a wavelength of 490 nanometers.

Results were:

TRANSMITTANCE AT 490 NANOMETERS

| TIME (min.) | CONTROL | PYRIDINE | ACETIC ACID |
| --- | --- | --- | --- |
| 0 | 3.5 | 16 | 4 |
| 0.5 | 3.5 | 69 | 6 |
| 1.0 | 3.5 | 87 | 9.5 |
| 1.5 | 4 | 91 | 14 |
| 2.0 | 4 | 91 | 19 |
| 3.0 | 4 | 91 | 31 |
| 4.0 | 4 | 91 | 42.5 |
| 6.0 | 4 | 91 | 61.5 |
| 8.0 | 4 | 91 | 74 |
| 10.0 | 4 | 91 | 81 |
| 12.0 | 4 | 91 | 85 |

As can be seen, the addition of either acetic acid or the base pyridine dramatically increased the fading rate of the photochromic solution.

What is claimed is:

1. A photochromic composition suitable for incorporation into a binder, solvent or emulsion, comprising:
   a. at least one naphthopyran compound represented in its nonirradiated form by the structural formula

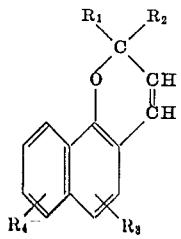

wherein:
   $R_{1-2}$ are substituents individually selected from hydrogen; halide; $C_1$–$C_5$ alkyl; $C_1$–$C_2$ alkoxy; t-amine; phenyl; and substituted phenyl having up to two substituents individually selected from halide, $C_1$–$C_5$ alkyl, $C_1$–$C_2$ alkoxy, nitro, amide and p-, s-, or t-amine; and,
   $R_{3-4}$ are substituents individually selected from $R_{1-2}$ substituents; pt or s-amine; and amide; and,
   b. from about 0.1 to about 10 percent of either a base of a weak to moderate strength acid having a pKa of from about 4 to about 14.

2. A composition of claim 1 wherein $R_1$ and $R_2$ represent phenyl substituents.

3. A composition of claim 2 containing a minor of a base having a pKb valve measured at 25° C. in the range of from about 2.5 to about 9.

4. A composition of claim 3 wherein said base comprises pyridine.

5. A composition of claim 2 containing a minor amount of an acid having pKa value measured at 25° C. in the range of from about 4.5 to about 9.

6. A composition of claim 5 wherein said acid comprises acetic acid.

7. A process for increasing the fading rate of the irradiated species of photochromic naphthopyrans represented in the nonirradiated form by the structural formula

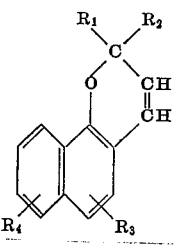

Wherein:
$R_{1-2}$ are substituents individually selected from hydrogen; halide; $C_1$–$C_5$ alkyl; $C_1$–$C_2$ alkoxy; t-amine; phenyl; and substituted phenyl having up to two substituents individually selected from halide, $C_1$–$C_5$ alkyl, $C_1$–$C_2$ alkoxy, nitro, amide, and p-, s- or t-amine; and
$R_{3-4}$ are substituents individually selected from $R_{1-2}$ substituents; p- or s-amines;
and, amide; said process comprising:
contacting the irradiated naphthopyran with a minor amount of either a base or a weak to moderate strength acid.

8. A process of claim 7 wherein $R_1$ and $R_2$ represent phenyl substituents.

9. A process of claim 7 wherein said base has a pKb value measured at 25° C. in the range of from about 2 to about 14 and said acid has a pKa value measured at 25° C. in the range of from about 4 to about 14.

10. A process of claim 7 wherein said irradiated naphthopyran is contacted with a minor amount of a base having a pKb value measured at 25° C. in the range from about 2.5 to about 9.

11. A process of claim 10 wherein said base comprises pyridine.

12. A process of claim 11 wherein $R_1$ and $R_2$ represent phenyl substituents.

13. A process of claim 7 wherein said irradiated naphthopyran is contacted with a minor amount of an acid having a pKa value measured at 25° C. in the range of from about 4.5 to 9.

14. A process of claim 13 wherein said acid comprises acetic acid.

15. A process of claim 14 wherein $R_1$ and $R_2$ represent phenyl substituents.